(12) United States Patent
Schneider et al.

(10) Patent No.: US 9,062,703 B2
(45) Date of Patent: Jun. 23, 2015

(54) BLIND RIVET AND WORKPIECE ARRANGEMENT

(71) Applicant: NEWFREY LLC, Newark, DE (US)

(72) Inventors: Stefan Schneider, Geissen (DE); Mario Bildat, Geissesn (DE)

(73) Assignee: NEWFREY LLC, Newark, DE (US)

( * ) Notice: Subject to any disclaimer, the term of this patent is extended or adjusted under 35 U.S.C. 154(b) by 0 days.

(21) Appl. No.: 14/190,894

(22) Filed: Feb. 26, 2014

(65) Prior Publication Data

US 2014/0186141 A1 Jul. 3, 2014

Related U.S. Application Data

(63) Continuation of application No. PCT/EP2012/065820, filed on Aug. 13, 2012.

(30) Foreign Application Priority Data

Sep. 15, 2011 (DE) .......................... 10 2011 113 362

(51) Int. Cl.
*F16B 13/04* (2006.01)
*F16B 19/10* (2006.01)
*F16B 5/04* (2006.01)

(52) U.S. Cl.
CPC ............... *F16B 19/1036* (2013.01); *F16B 5/04* (2013.01); *F16B 19/1054* (2013.01)

(58) Field of Classification Search
USPC ............. 411/34, 38, 500, 501, 506, 508, 509, 411/510
See application file for complete search history.

(56) References Cited

U.S. PATENT DOCUMENTS

| 2,324,142 | A | * | 7/1943 | Eklund ........................... 411/38 |
| 4,958,971 | A | * | 9/1990 | Lacey et al. ..................... 411/38 |
| 5,312,215 | A | * | 5/1994 | Anquetin ........................ 411/38 |
| 5,380,135 | A | * | 1/1995 | Anquetin ........................ 411/38 |
| 6,004,086 | A | * | 12/1999 | Gand et al. ...................... 411/38 |
| 6,254,324 | B1 | * | 7/2001 | Smith et al. ..................... 411/34 |
| 6,719,509 | B1 | * | 4/2004 | Huang et al. .................... 411/32 |
| 6,761,520 | B1 | * | 7/2004 | Dise ............................... 411/38 |
| 7,396,287 | B2 | * | 7/2008 | Jennings et al. ................. 470/29 |
| 2003/0219324 | A1 | * | 11/2003 | Piacenti et al. ................. 411/38 |

FOREIGN PATENT DOCUMENTS

| DE | 8430648 | 1/1985 |
| EP | 0677666 | 10/1995 |
| EP | 1217229 | 6/2002 |

* cited by examiner

*Primary Examiner* — Roberta Delisle
(74) *Attorney, Agent, or Firm* — Kofi Schulterbrandt; Michael P. Leary

(57) ABSTRACT

A blind rivet having a rivet sleeve and a pin, the rivet sleeve having a sleeve head for contact with a visible-side workpiece surface and a sleeve shank and a through hole, through which the pin is guided, the pin having a blind-side pin head for contact in the region of a blind-side end of the sleeve shank, and the sleeve shank having a first forming section and a second forming section which is arranged axially spaced apart from the first forming section and closer to the sleeve head, a first intermediate section being formed between the first and the second forming section, which first intermediate section, during setting of the blind rivet, can form a first blind head which can be formed at axially different points in order to set up different clamping thicknesses.

10 Claims, 4 Drawing Sheets

BLIND RIVET AND WORKPIECE ARRANGEMENT

CROSS-REFERENCE TO RELATED APPLICATIONS

This application is a continuation of PCT/EP2012/065820, filed Aug. 13, 2012 which claims priority from German Patent Application No. DE 10 2011 113 362.7, filed Sep. 15, 2011, the disclosure of which is incorporated herein by reference in its entirety.

FIELD OF THE INVENTION

The present invention relates to a blind rivet having a rivet sleeve and a pin, the rivet sleeve having a sleeve head for contact with a visible-side workpiece surface and a sleeve shank and a through hole, through which the pin is guided, the pin having a blind-side pin head for contact in the region of a blind-side end of the sleeve shank, and the sleeve shank having a first forming section and a second forming section which is arranged axially spaced apart from the first forming section and closer to the sleeve head, a first intermediate section being formed between the first and the second forming section, which first intermediate section, during setting of the blind rivet, can form a first blind head which can be formed at axially different points in order to set up different clamping thicknesses.

Furthermore, the present invention relates to a workpiece arrangement having a first workpiece and at least one second workpiece which are connected to one another by a blind rivet of the stated type. Blind rivets which have a rivet sleeve or a rivet body and a pin which penetrates the former are used to connect workpieces, access being possible only from one side (the visible side). Here, the blind rivet is introduced with the blind-side pin head through holes formed in advance in the workpieces. The joining operation takes place subsequently by the pin being pulled off from the workpieces on the visible side (for example, by means of blind-riveting tongs). This leads on the blind side to a deformation of the blind-side end of the sleeve shank and/or the formation of a blind head which, after setting, bears against the blind-side workpiece surface.

BACKGROUND OF THE INVENTION

Here, as a result of the formation of a first and a second forming section, between which an intermediate section is formed, the blind rivet can connect arrangements of at least two work-pieces with different thicknesses to one another (what is known as a multiple-region rivet or a rivet with variable grip).

Here, different requirements exist which partially go against one another. Firstly, the range of the possible clamping thicknesses should be as large as possible. Furthermore, the radial widening of the rivet sleeve should be limited in the region of the workpieces. This is intended to avoid rivet-sleeve material being squeezed between the workpieces on account of great radial widening. Here, there is firstly the risk that the workpieces burst open. Furthermore, this can lead to leaks (blind rivets of the described type can optionally also achieve a sealing action with respect to fluids).

Furthermore, in some applications, the workpieces do not bear against one another in an initial state. In this case, it should be ensured during the forming of the rivet sleeve that the workpieces are first of all drawn towards one another ("tightened") before the setting operation is ended (the pin tears off at a predetermined break point which is provided as a rule).

An improved drawing or tightening behaviour of this type can optionally also avoid an operating person of a blind-rivet tool having to exert a prestressing force on the workpiece arrangement before the setting operation.

Document WO 2009/098431 A1 discloses a blind rivet of this type with variable grip. Here, the pin head is configured to engage around the blind-side end of the sleeve shank. Furthermore, adjacently to the pin head, the pin has radial projections which engage behind deformed material of the rivet sleeve. This can prevent the residual pin accidentally being detached from the workpiece connection which is produced in this way, after setting and after tearing off at the predetermined break point.

A further blind rivet with variable grip is known from document EP 0 677 666 B1.

Against the above background, it is an object of the invention to specify an improved blind rivet and an improved workpiece arrangement.

BRIEF SUMMARY OF THE INVENTION

In the blind rivet mentioned in the introduction, this object is achieved by the fact that the sleeve shank has a third forming section which is arranged axially spaced apart from the second forming section and closer to the sleeve head, a second intermediate section being formed between the second and the third forming section in such a way that, during setting of the blind rivet for setting up relatively great clamping thicknesses, the second intermediate section is arranged axially between the first blind head, which is formed by the first intermediate section, and the sleeve head and, during setting of the blind rivet for setting up relatively small clamping thicknesses, forms a second blind head.

Furthermore, the above object is achieved by a workpiece arrangement of the type stated in the introduction, the two workpieces being connected to one another by a blind rivet of this type.

The blind rivet according to the invention firstly makes a great range of achievable clamping thicknesses possible. In the case of relatively great clamping thicknesses, only one blind head is produced which is formed substantially by the first intermediate section. Here, the second intermediate section is not widened or is not widened substantially, with the result that there is no risk of radial squeezing of the workpieces. In the case of relatively small clamping thicknesses, the first blind head is formed from the first intermediate section and subsequently a second blind head is formed from the second intermediate section, which blind heads lie axially behind one another, only the second blind head bearing against the blind-side workpiece surface and ensuring the connection of the workpieces.

In addition, the blind rivet according to the invention has the advantage that the workpieces which are to be connected to one another are drawn to one another automatically, even if they are spaced apart relatively far from one another. Here, the workpieces are clamped axially between the sleeve head and the respective blind head before the pin tears off. This can achieve a reliable, in particular rattle-free connection. In the case of relatively great clamping thicknesses, the first blind head ensures the axial clamping. In the case of smaller clamping thicknesses, the second blind head ensures axial clamping of the workpieces.

As a result of the fact that the workpieces are clamped to one another by means of the blind rivet according to the invention, it is also not necessary that an operating person of blind-rivet tongs or a blind-rivet gun has to build up a high prestressing force in advance, in order to press the workpieces against one another. As a result, the force application is considerably reduced for the operating person.

In the present case, a forming section is understood to be a section of the sleeve shank which can be deformed itself and/or can contribute to a targeted deformation of the sleeve shank. In particular, the forming sections which are adjacent to an intermediate section are configured in such a way that, if a setting force is applied to the sleeve shank, the intermediate section is widened radially, in order in this way to achieve a large bearing area of the respective blind head on the blind-side workpiece surface.

It is of particular preference in the present invention if the forming sections are configured in such a way that a higher force is necessary for radially widening the second intermediate section than for radially widening the first intermediate section. This achieves a situation where, when the setting force is applied to the sleeve shank, the first intermediate section is first to be widened radially, and the second intermediate section is then widened only when the setting force is increased and at the same time no clamping position of the first blind head has been achieved (as is typically the case for relatively small clamping thicknesses). This is because, in the case of relatively small clamping thicknesses, first of all the first intermediate section is widened and migrates in the axial direction towards the sleeve head. Only when this deformation is largely concluded is the second intermediate section also widened, with the result that it can grip a thinner workpiece arrangement comprising two workpieces which are spaced apart from one another. If the setting force is increased further, the second blind head then also migrates in the axial direction towards the sleeve shank and therefore draws the workpieces against one another until the pin breaks.

Here, the axial clamping of the workpieces (the tightening) takes place in each case after the radial first widening of the first and the second blind head, and by virtue of the fact that the radially widened respective intermediate section migrates in the axial direction towards the sleeve head as a result of the application of the axial setting force. After the breaking of the pin, the workpieces optionally spring slightly open and are connected to one another permanently by way of a remaining axial prestress with respect to one another.

The forming sections can be formed in various ways. For example, they can be formed by a suitable material selection, optionally also in comparison with the intermediate sections. Furthermore, the forming sections can be set up by processing of an originally cylindrical sleeve shank. This can take place, for example, by processing of the outer circumference of the sleeve section. Here, the processing preferably takes place without the removal of material. In particular, it is preferred if the forming sections are set up by cold working of the sleeve shank.

The object is therefore achieved completely.

It is of particular preference if the third forming section is immediately adjacent to the sleeve head.

As a result, an axially compact blind rivet can be provided.

According to one particularly preferred embodiment, the sleeve shank has a fourth forming section which is arranged between the second and the third forming section, the second intermediate section being formed between the third forming section and the fourth forming section.

In this refinement, the second intermediate section is formed in a targeted manner by two forming sections which are configured independently of the forming sections for forming the first intermediate section. The third and the fourth forming section and the intermediate section which is set up by them can therefore be formed differently to the first and the second forming section, with the result that, in particular, the required widening forces of the second and of the first intermediate section can be set to be different.

It is of particular preference overall if at least one of the forming sections is formed by an embossed portion on the outer circumference of the sleeve section.

The embossed portion can be a radial embossed portion. The embossed portion can be an axially roll-formed embossed portion. Furthermore, the embossed portion can be formed by a plurality of individual embossed sections which are distributed over the circumference of the sleeve shank and are oriented in the longitudinal direction.

Here, it is particularly preferred if an embossed portion which forms the third or the fourth forming section is radially deeper than an embossed portion which forms the first or the second forming section.

As a result, the material can be pre-strengthened further in the region of the second intermediate section, with the result that higher forces are necessary for radially widening the second intermediate section.

According to a further embodiment which is preferred overall, at least one of the forming sections is formed by a conical embossed portion.

As a result of the conical design of the forming sections, a favourable deformation behaviour can be set up in the radial direction for the respective intermediate section.

Here, it is of particular preference if the first and the second and/or the third and the fourth forming sections are formed by conical embossed portions, the diameters of which increase towards the respective intermediate section.

As a result, the desired widening behaviour can be further influenced positively.

Furthermore, it is preferred overall if the second intermediate section is axially shorter than the first intermediate section.

This can also achieve a situation where higher forces are required for radially widening the second intermediate section.

In general, the sleeve shank can be produced from a uniform material. According to a further preferred embodiment, however, the material of the sleeve shank in the region of the second intermediate section is harder than the material of the sleeve shank in the region of the first intermediate section.

As a result, the above-described characteristic can be set up, the second intermediate section requiring greater radial widening forces.

In other words, the function of the blind rivet according to the invention can also be described as follows. By a different configuration of the first and the second intermediate section, a force application of different magnitude is required for radially widening the rivet sleeve towards a disc-shaped configuration of the respective blind head. During setting of the blind rivet, first of all a blind head is formed by the first intermediate section adjacent to the blind-side end of the sleeve shank (for example, on account of a smaller embossing depth). When this first blind head which is formed first of all comes into contact with the blind-side workpiece, to be precise on account of a migrating movement of the first blind head towards the blind-side workpiece, this blind-side workpiece is drawn (tightened) against the visible-side workpiece. When the two workpieces lie against one another without a gap, and/or a seal is prestressed between the workpieces, the axial force between the workpieces rises during further drawing of the pin. When the breaking load of the pin is reached, the said pin breaks. After slight springing open, the workpieces are connected permanently with a residual prestress and can be released only by destruction of the blind rivet. However, the migrating movement of the first blind head towards the blind-side workpiece is possible only to a limited extent. The end of the migrating movement is reached when the strengthening of the rivet-sleeve material on account of the radial widening has reached its peak. The further drawing on the pin brings about a rise of the axial force in the pin. If then, at the end of the migrating movement of the first blind head, the latter still does not bear against the blind-side component, that is to say there is still a considerable spacing between the first blind head and the blind-side workpiece, the formation of the second blind head starts from a defined higher axial force in the pin. The forming sections for the second intermediate section are configured in such a way that, in comparison with the first and the second forming section, a higher resistance to radial widening of the second intermediate section is achieved. If then this second blind head comes into contact with the blind-side component on account of an axial migrating movement towards the latter, the workpieces are drawn against one another. When the components bear against one another without a gap and/or a seal is prestressed between the workpieces, the axial force between the workpieces rises again during further drawing of the pin. The prestress of the workpieces starts. When the breaking load of the pin is reached, the said pin breaks and, after slight springing open, the components are connected permanently with a residual prestress and can be released only by destruction of the fastener.

The overall result with the blind rivet according to the invention is at least one of the following advantages.

Firstly, workpieces with a different clamping thickness can be connected with a single type of blind rivet. Here, the drawing or tightening capability is higher than in the case of conventional blind rivets or multiple-region blind rivets (multi-grip rivets).

In comparison with known blind rivets, the capability to tighten components before the actual prestressing operation is increased considerably on account of the formation of two blind heads.

Furthermore, reduced radial widening of the rivet sleeve can be achieved by way of the invention. In particular, the rivet sleeve is widened in a controlled manner virtually exclusively in the region between the forming sections on the rivet sleeve.

On account of the migrating movement of the blind head, the workpieces are drawn towards one another without assistance by an operating person. As a result, a burden for the operating person can be reduced. In particular, the said operating person does not have to press a rivet gun or rivet tongs against the workpieces even with a preset minimum force.

It goes without saying that the features which are stated above and those which are still to be explained in the following text can be used not only in the respectively specified combination, but also in other combinations or on their own, without departing from the scope of the present invention.

BRIEF DESCRIPTION OF THE DRAWINGS

Exemplary embodiments of the invention are shown in the drawing and will be explained in greater detail in the following description. In the drawing.

DETAILED DESCRIPTION OF THE INVENTION

Figure 1:
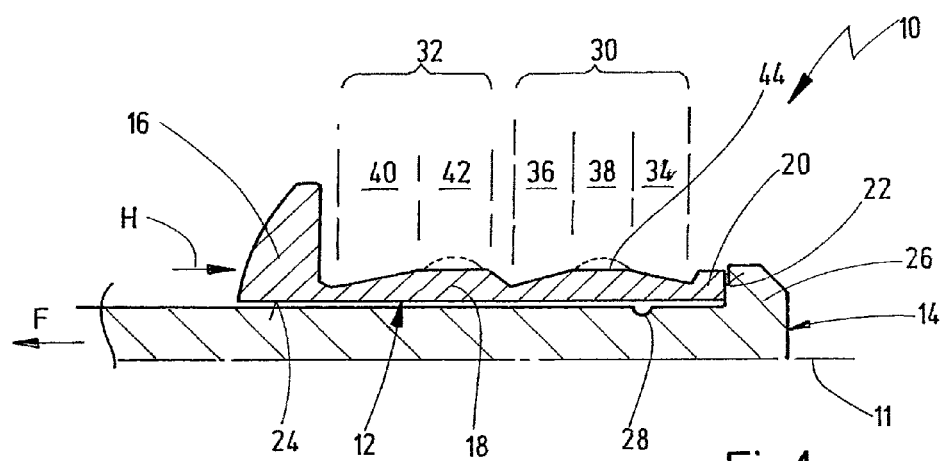
FIG. 1 shows a diagrammatic half-side longitudinal sectional view through a first embodiment of a blind rivet according to the invention.

FIG. 1 diagrammatically shows a first embodiment of a blind rivet which is denoted overall by 10.

The blind rivet 10 has a rivet sleeve 12 and a pin 14. The rivet sleeve 12 has a sleeve head 16 for bearing against a visible-side workpiece surface and a sleeve shank 18 which adjoins the former and is formed in one piece with it. The sleeve shank 18 has a blind-side end 20 with an end side 22 which points away from the sleeve head 16. The rivet sleeve 12 has a through hole 24. The pin 14 is introduced into the through hole 24, to be precise from the blind-side end 20, with the result that a pin head 26 of the pin 14 bears against the end side 22. The pin 14 has a predetermined break point 28.

In the axial direction, the sleeve shank 18 has a primary region 30 and a secondary region 32, the primary region 30 being adjacent to the blind-side end 20, and the secondary region 32 being adjacent to the sleeve head 16.

The primary region 30 contains a first forming section 34 and a second forming section 36, a first intermediate section 38 being formed between the first forming section 34 and the second forming section 36.

The secondary region 32 has a third forming section 40, a second intermediate section 42 being formed between the third forming section 40 and the second forming section 36.

The forming sections 34, 36, 40 can be formed in each case by embossed portions on the outer circumference of the sleeve shank 18, which embossed portions are, for example, of conical configuration. Here, the first and the second forming section 34, 36 are of conical configuration such that their diameter increases towards the first intermediate section 38. As a result of the embossing with respect to a circumferential face (shown diagrammatically in FIG. 1) of the sleeve shank 18, it can occur that the first intermediate section 38 and/or the second intermediate section 42 are/is pressed out in the radial direction with respect to the original external diameter 44 of the sleeve shank 18, as is indicated using a dashed line in FIG. 1.

In order to set the blind rivet 10, it is first of all introduced with the pin head 26 at the front through premanufactured holes in one or two workpieces, until an underside of the sleeve head 16 bears against a visible-side workpiece surface. The sleeve head 16 is subsequently fixed, for example by a holding force H. A setting force F is subsequently exerted on the pin 14 by means of a rivet gun. Here, the sleeve shank 18 is deformed in such a way that a blind head is formed which bears against the blind-side workpiece surface, to be precise by the first intermediate section 38 or by the second intermediate section 42. The setting force F is then increased further, until the workpieces bear against one another and finally the pin 14 breaks in the region of the predetermined break point 28.

Here, the pin in the region of the pin head and in the region of the pin shank adjacent to the pin head can be configured similarly to that described in document WO 2009/098431 A1; reference is made here to the full scope of the disclosure contents of the said document.

Figure 2:
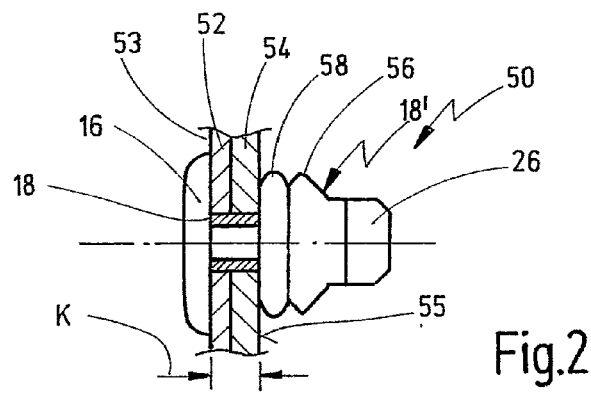
FIG. 2 shows a diagrammatic longitudinal sectional view through the set blind rivet of FIG. 1 in the case of a relatively small clamping thickness.

FIG. 2 shows a workpiece arrangement 50 which is finished by means of the blind rivet 10 and has a first workpiece 52 with a visible-side workpiece surface 53 and a second workpiece 54 with a blind-side workpiece surface 55.

The two workpieces 52, 54 are relatively thin, with the result that a relatively small clamping thickness K is set up for the blind rivet 10. If two workpieces with a relatively great clamping thickness K are connected by means of the blind rivet 10, substantially only a first blind head 56 is formed by the first intermediate section 38, the second intermediate section 42 not being radially widened or being radially widened only to a small extent. In this embodiment, only the first blind head 56 then bears against the blind-side workpiece surface 55.

However, the illustration of FIG. 2 shows a workpiece arrangement with a relatively small clamping thickness K. Here, first of all the first blind head 56 has been formed by the first intermediate section 38 during the setting operation. In the case of a further increase in the setting force F, a second blind head 58 has then been formed on the basis of the second intermediate section 42, which second blind head 58 finally bears against the blind-side workpiece surface 55.

In both cases (in the case of a great clamping thickness and in the case of a small clamping thickness), the blind heads migrate in the axial direction during the setting operation, with the result that the workpieces 52, 54 are drawn against one another and are clamped axially against one another before the pin 14 breaks.

The further FIGS. 3 to 9 show alternative embodiments of blind rivets which are likewise configured as multiple-region rivets and, depending on the clamping thickness, form either only the first blind head 56 or both the first and the second blind head 56, 58. Here, the blind rivets described in the following text correspond with regard to construction and function in general to the blind rivet 10 of FIG. 1. Identical elements are therefore labelled by identical reference numerals. The differences will be essentially explained in the following text.

Figure 3:
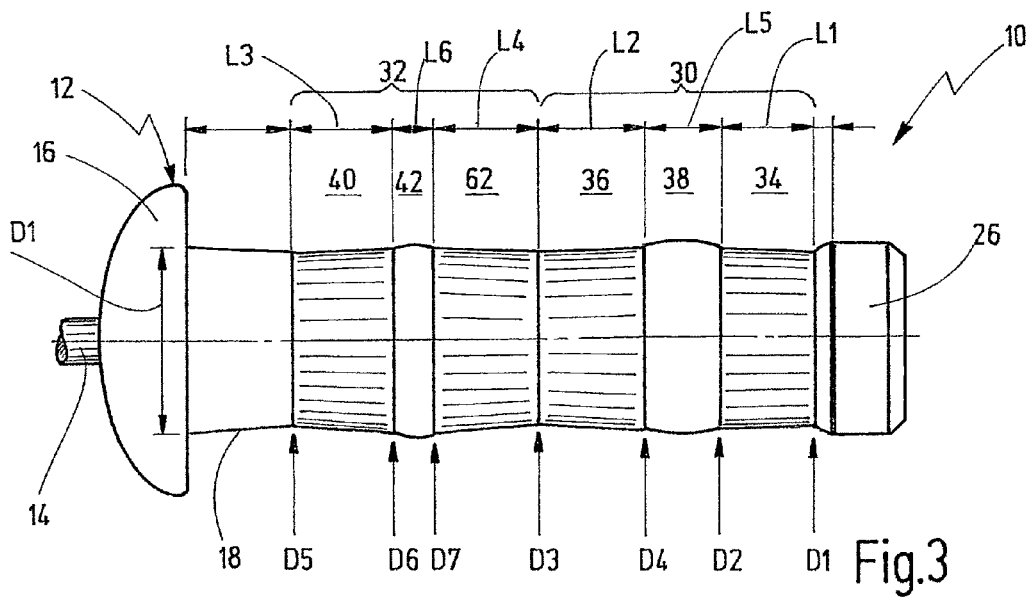
FIG. 3 shows a diagrammatic longitudinal view of a further embodiment of a blind rivet according to the invention.

FIG. 3 shows a further embodiment of a blind rivet 10, in which a fourth forming section 62 is configured in addition to the third forming section 40. In this embodiment, the fourth forming section 62 is axially adjacent to the second forming section 36, it also being possible, however, for a web to be set up between them. The second intermediate section 42 lies in the axial direction between the third forming section 40 and the fourth forming section 62.

In this embodiment, the deformation behaviour of the second intermediate section 42 can be set more precisely.

Furthermore, FIG. 3 shows various dimensions. It is thus shown that the first forming section 34 has an axial length L1. The second forming section 36 has an axial length L2. The third forming section 40 has an axial length L3. The fourth forming section 62 has a length L4. The first intermediate section 38 has an axial length L5. The second intermediate section 42 has an axial length L6.

In one preferred embodiment, the lengths L1, L2, L3, L4 are approximately identically long. The axial length L5 of the first intermediate section 38 is greater, however, than the axial length L6 of the second intermediate section 42, at least one and a half times as great, preferably at least twice as great. In particular, it can hold that: $L6 \cdot 2.5 \approx L5$.

The first forming section 34 has a diameter D1 on the blind side and a diameter D2 on the visible side. Accordingly, the second forming section 36 has a diameter D3 on the visible side and a diameter D4 on the blind side. The third forming section 40 has a diameter D5 on the visible side and a diameter D6 on the blind side. The fourth forming section has the diameter D3 on the blind side and a diameter D7 on the visible side.

In one embodiment, the diameters D1, D3, D5 are identical and in each case smaller than the diameters D2, D4, D6, D7. In one embodiment, these last-mentioned diameters are also identical. As long as a web is provided between the second forming section 36 and the forming section 62, the diameters D1, D3 can also be greater than the diameter D5 and a corresponding diameter (for example D8, not shown) of the fourth forming section 62.

Figure 4:
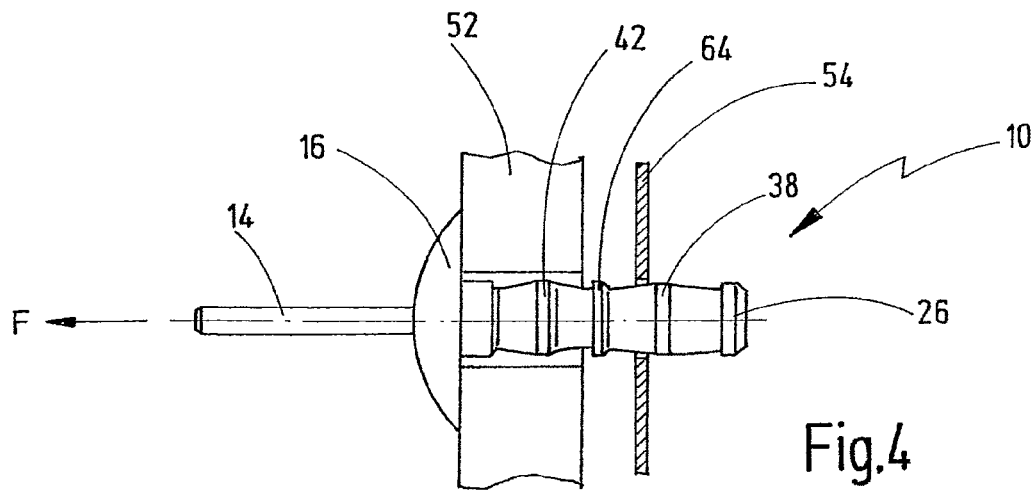
FIG. 4 shows a further embodiment of a blind rivet according to the invention, the latter being used to produce a workpiece arrangement with a relatively great clamping thickness.
Figure 5:
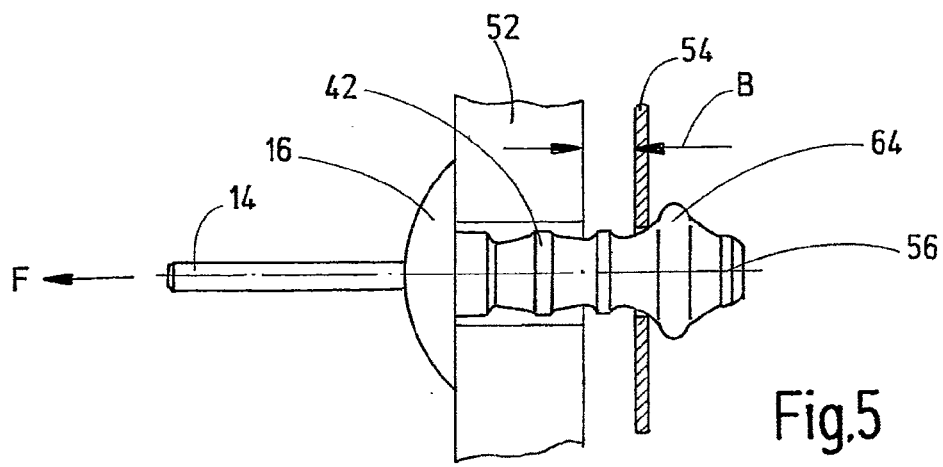
FIG. 5 shows the blind rivet of FIG. 4 after a first radial widening operation of a first blind head.
Figure 6:
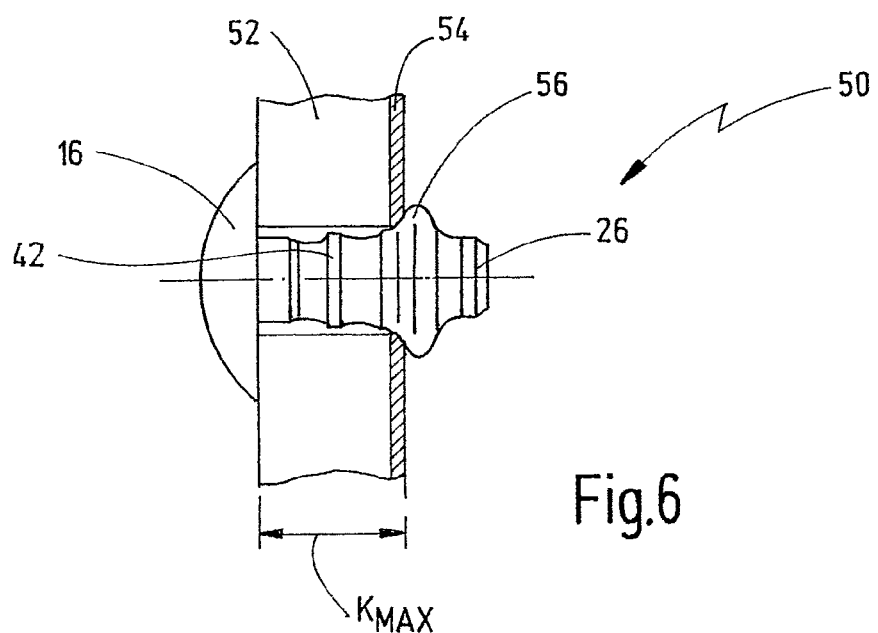
FIG. 6 shows the blind rivet of FIGS. 4 and 5 after setting and after breaking of the pin.

A blind rivet with a web of this type between the second and the fourth forming section 36, 62 is shown, for example, in FIG. 4. FIGS. 4 to 6 show how this blind rivet is deformed during setting, in order to fix two workpieces 52, 54 with a relatively great clamping thickness $K_{MAX}$ to one another. Here, FIG. 4 shows an initial state. Here, the workpieces 52, 54 are spaced apart from one another, and the blind rivet 10 protrudes beyond the second workpiece 54 to such an extent that the first intermediate section 38 likewise protrudes on the blind side with respect to the second workpiece 54.

As a result of application of the setting force F, first of all the first intermediate section 38 is deformed, as is shown in FIG. 5. More precisely, the first intermediate section 38 is widened radially. As a result of further application of a setting force, the widened first intermediate section 38 which is formed as a result (and forms a first blind head 56) migrates in the axial direction towards the sleeve head 16. As a result, a spacing B between the workpieces 52, 54 is overcome. In other words, the second workpiece 54 is tightened with respect to the first workpiece 52. Here, the setting force F is so low that the second intermediate section 42 is not widened or is substantially not widened radially. Finally, the first blind head 56 passes into a position, in which the workpieces 52, 54 bear against one another, as is shown in FIG. 6. As a result of the setting force F being increased, the pin 14 breaks, and the workpiece arrangement 50 is produced.

Figure 7:
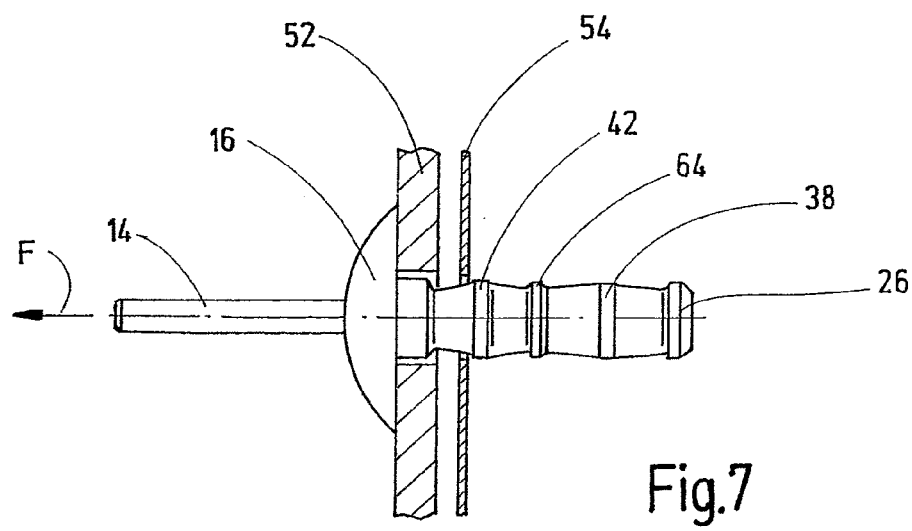
FIG. 7 shows an arrangement comparable to FIG. 4 of the same blind rivet for producing a workpiece arrangement with a relatively small clamping thickness.
Figure 8:
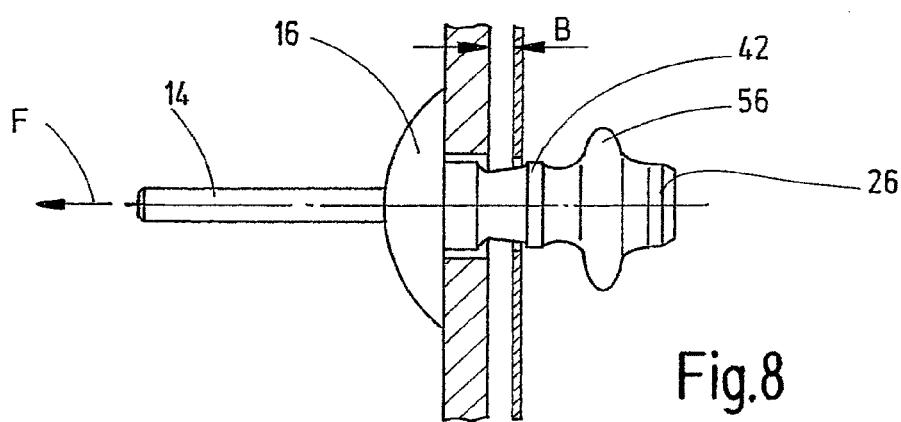
FIG. 8 shows the blind rivet of FIG. 7 shortly before the formation of a second blind head.
Figure 9:
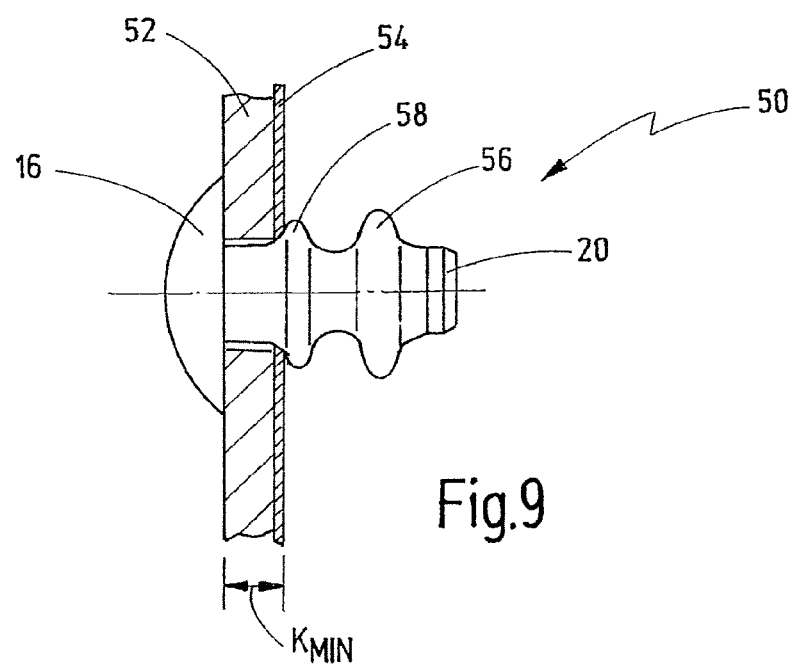
FIG. 9 shows the blind rivet of FIGS. 7 and 8 after setting and after breaking of the pin.

FIGS. 7 to 9 show a similar sequence for forming a workpiece arrangement 50 with a small clamping thickness $K_{MIN}$. Here, the second intermediate section 42 lies on the blind side outside the workpieces 52, 54 which are spaced apart from one another by a spacing B.

When the setting operation is carried out, the axial setting force F is once again applied. Here, first of all the first blind head 56 is formed by the first intermediate section 38. The first blind head 56 then migrates in the axial direction, until the maximum material widening is reached (FIG. 8). As a result of a further increase in the setting force F, the second intermediate section 42 then begins to be widened radially and to migrate in the axial direction towards the sleeve head 16. As a result, the second workpiece 54 is drawn against the first workpiece 52. Finally, an axial prestress is set up between the two workpieces 52, 54, until the pin 14 breaks and a workpiece arrangement 50 is produced, as is shown in FIG. 9.

Here, the second blind head 58 bears against the blind-side workpiece surface, in a similar manner as in the illustration of FIG. 2. The first and the second blind head 56, 58 can be spaced apart from one another, but can also bear axially against one another, as is shown in FIG. 2.

Figure 10:
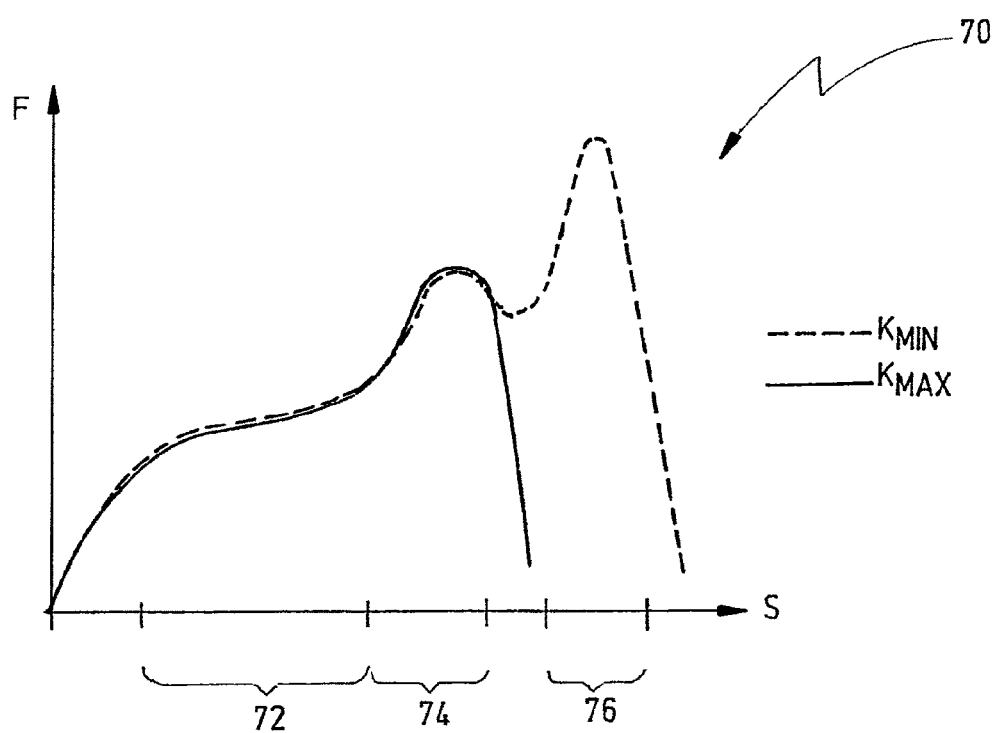
FIG. 10 shows a schematic diagram of force plotted against travel in setting operations with a minimum and with a maximum clamping thickness.

FIG. 10 schematically shows a diagram of the profile of the setting force F plotted against the travel S of the pin 14. The profile for a relatively great clamping thickness $K_{MAX}$ is shown by a continuous line. The profile for a relatively small clamping thickness $K_{MIN}$ is shown by a dashed line.

In both cases, the result is first of all a first travel section 72, in which the first intermediate section 38 is widened radially and migrates in the axial direction. In a subsequent travel section 74, the first blind head 56 is widened radially to a maximum extent and the workpieces are drawn against one another, until the pin 14 breaks at the end of the travel section 74 with a great clamping thickness. In the variant in which a relatively small clamping thickness is set up, an increase in the setting force F takes place after the maximum radial widening of the first blind head 56 in a third travel section 76, by way of which increase in the setting force F the second intermediate section 42 is widened radially and migrates in the axial direction, until finally the pin breaks at the end of the third travel section 76.

The invention claimed is:

1. A blind rivet having a rivet sleeve and a pin, the rivet sleeve having a sleeve head for contact with a visible-side workpiece surface and a sleeve shank and a through hole, through which the pin is guided, the pin having a blind-side pin head for contact in the region of a blind-side end of the sleeve shank, and the sleeve shank having a first forming section and a second forming section which is arranged axially spaced apart from the first forming section and closer to the sleeve head, a first intermediate section being formed between the first and the second forming section, which first intermediate section, during setting of the blind rivet, can form a first blind head which can be formed at axially different points in order to set up different clamping thicknesses, wherein the sleeve shank has a third forming section which is arranged axially spaced apart from the second forming section and closer to the sleeve head, a second intermediate section being formed between the second and the third forming section in such a way that, during setting of the blind rivet for setting up relatively great clamping thicknesses, the second intermediate section is arranged axially between the first blind head, which is formed by the first intermediate section, and the sleeve head and, during setting of the blind rivet for setting up relatively small clamping thicknesses, forms a second blind head, wherein at least one of the first, second, and third forming sections are of conical configuration such that its diameter increases toward its respective intermediate section.

2. The blind rivet according to claim 1, wherein the third forming section is immediately adjacent to the sleeve head.

3. The blind rivet according to claim 1, wherein the sleeve shank has a fourth forming section which is arranged between the second and the third forming section, the second intermediate section being formed between the third forming section and the fourth forming section.

4. The blind rivet according to claim 1, wherein at least one of the forming sections is formed by an embossed portion on the outer circumference of the sleeve section.

5. The blind rivet according to claim 4, wherein an embossed portion which forms the third or the fourth forming section is radially deeper than an embossed portion which forms the first or the second forming section.

6. The blind rivet according to claim 1, wherein at least one of the forming sections is formed by an embossed portion.

7. The blind rivet according to claim 6, wherein the third and the fourth forming section are formed by conical embossed portions, the diameter of which increases towards the second intermediate section.

8. The blind rivet according to claim 1, wherein the second forming section is axially shorter than the first intermediate section.

9. The blind rivet according to claim 1, wherein the material of the sleeve shank in the region of the second intermediate section is harder than the material of the sleeve shank in the region of the first intermediate section.

10. A workpiece arrangement having a first workpiece and at least one second workpiece which are connected to one another by the blind rivet according to claim 1.

\* \* \* \* \*